United States Patent
Mandelbaum et al.

(10) Patent No.: US 9,225,456 B2
(45) Date of Patent: Dec. 29, 2015

(54) POST-TRANSIENT GAIN CONTROL OF OPTICAL AMPLIFIERS

(71) Applicants: Idan Mandelbaum, Mahwah, NJ (US); Dogan Atlas, Johns Creek, GA (US)

(72) Inventors: Idan Mandelbaum, Mahwah, NJ (US); Dogan Atlas, Johns Creek, GA (US)

(73) Assignee: Fujitsu Limited, Kawasaki-shi (JP)

( * ) Notice: Subject to any disclaimer, the term of this patent is extended or adjusted under 35 U.S.C. 154(b) by 109 days.

(21) Appl. No.: 14/082,689

(22) Filed: Nov. 18, 2013

(65) Prior Publication Data

US 2015/0139654 A1    May 21, 2015

(51) Int. Cl.
*H04B 10/2507*    (2013.01)
*H04J 14/02*    (2006.01)

(52) U.S. Cl.
CPC ........ *H04J 14/0202* (2013.01); *H04B 10/2507* (2013.01)

(58) Field of Classification Search
None
See application file for complete search history.

(56) References Cited

U.S. PATENT DOCUMENTS

| | | | |
|---|---|---|---|
| 2003/0021009 A1* | 1/2003 | MacCormack et al. | 359/337 |
| 2003/0147125 A1* | 8/2003 | Sandell et al. | 359/341.41 |
| 2005/0041977 A1* | 2/2005 | Denkin et al. | 398/94 |
| 2005/0052731 A1* | 3/2005 | Corr et al. | 359/341.41 |

* cited by examiner

*Primary Examiner* — Darren E Wolf
(74) *Attorney, Agent, or Firm* — Baker Botts L.L.P.

(57) ABSTRACT

Methods and systems for post-transient gain control of optical amplifiers may include using a gain offset control module in an optical amplifier to generate a gain offset cancelling signal. The gain offset cancelling signal may be output to a gain control module in the optical amplifier to generate at least one of a pump signal and an attenuation control signal. In this manner, a gain offset may be cancelled for a plurality of wavelengths in an optical signal transmitted by an optical network.

11 Claims, 8 Drawing Sheets

POST-TRANSIENT GAIN CONTROL OF OPTICAL AMPLIFIERS

BACKGROUND

1. Field of the Disclosure

The present disclosure relates generally to optical communication networks and, more particularly, to a system and method for post-transient gain control of optical amplifiers.

2. Description of the Related Art

Telecommunication, cable television and data communication systems use optical networks to rapidly convey large amounts of information between remote points. In an optical network, information is conveyed in the form of optical signals through optical fibers. Optical networks may also include various network elements, such as amplifiers, dispersion compensators, multiplexer/demultiplexer filters, wavelength selective switches, optical switches, couplers, etc. configured to perform various operations within the network.

In particular, optical networks may be reconfigured to transmit different individual channels using, for example, optical add-drop multiplexers (OADMs). In this manner, individual channels (e.g., wavelengths) may be added or dropped at various points along an optical network, enabling a variety of network configurations and topologies. However, such network reconfiguration events may result in power transients among the surviving channels. In particular, steady-state gain offset as a result of network reconfiguration may result in undesired variations in signal power and/or optical signal to noise ratio (OSNR) in an optical network.

SUMMARY

In one aspect, a disclosed method for post-transient gain control of an optical amplifier includes receiving an optical signal having a plurality of wavelengths, generating a pump signal for a doped fiber amplification element, and multiplexing the optical signal and the pump signal into the doped fiber amplification element. The method may include generating a gain offset cancelling signal, and using the gain offset cancelling signal to generate the pump signal. A gain offset may be cancelled for the plurality of wavelengths in the optical signal output from the optical amplifier.

In particular embodiments, the method may include generating an attenuation control signal for a variable optical attenuator configured to receive the optical signal from the doped fiber amplification element, and using the gain offset cancelling signal to generate at least one of the pump signal and the attenuation control signal.

Additional disclosed aspects for receiving an optical signal having a plurality of wavelengths and performing post-transient gain control include an optical amplifier and an optical communication system, as described herein.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

Figure 1:
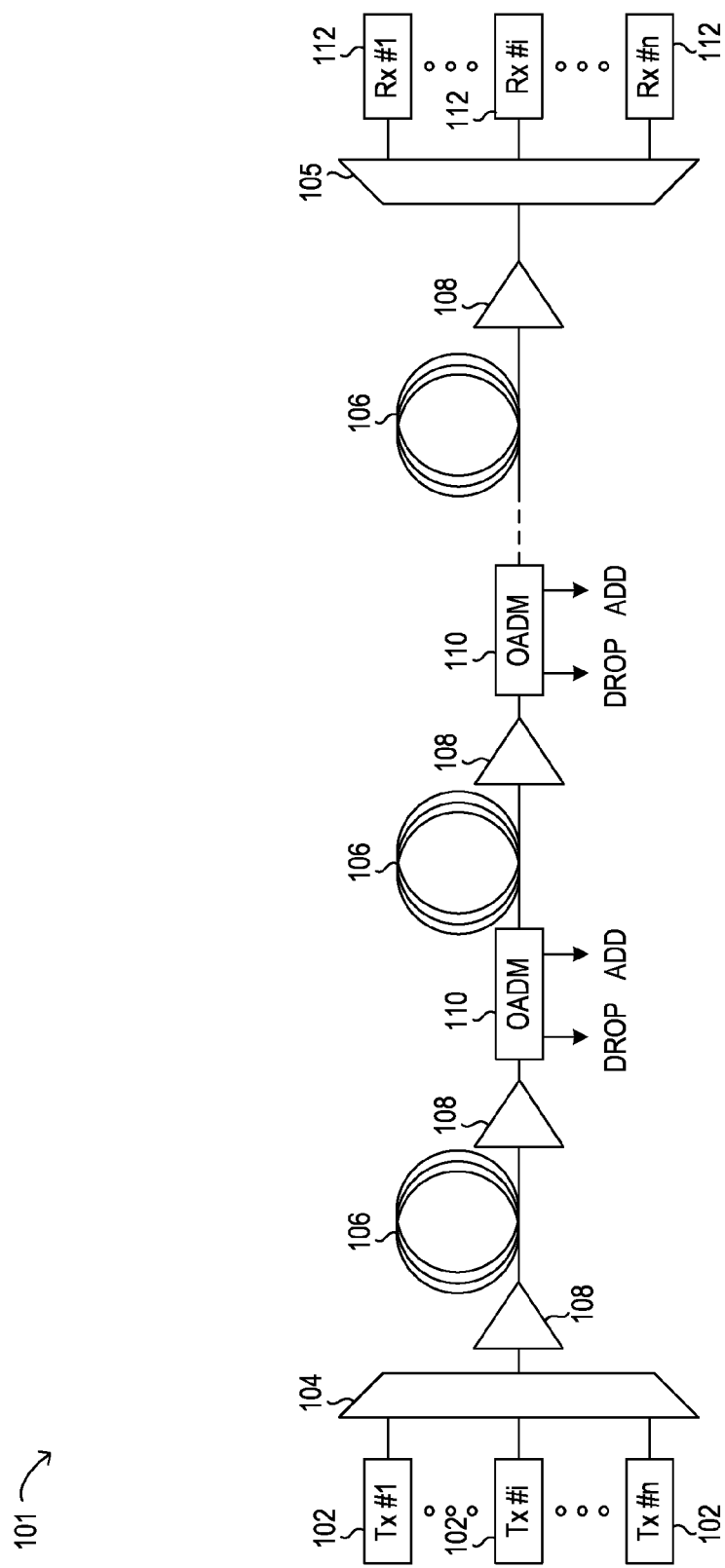
FIG. 1 is a block diagram of selected elements of an embodiment of an optical network.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), widget "12-1" refers to an instance of a widget class, which may be referred to collectively as widgets "12" and any one of which may be referred to generically as a widget "12". In the figures and the description, like numerals are intended to represent like elements.

Turning now to the drawings, FIG. 1 illustrates an example embodiment of optical network 101, which may represent an optical communication system. Optical network 101 may include one or more optical fibers 106 configured to transport one or more optical signals communicated by components of optical network 101. The network elements of optical network 101, coupled together by fibers 106, may comprise one or more transmitters 102, one or more multiplexers (MUX) 104, one or more optical amplifiers 108, one or more optical add/drop multiplexers (OADM) 110, one or more demultiplexers (DEMUX) 105, and one or more receivers 112.

Optical network 101 may comprise a point-to-point optical network with terminal nodes, a ring optical network, a mesh optical network, or any other suitable optical network or combination of optical networks. Optical fibers 106 comprise thin strands of glass capable of communicating the signals over long distances with very low loss. Optical fibers 106 may comprise a suitable type of fiber selected from a variety of different fibers for optical transmission.

Optical network 101 may include devices configured to transmit optical signals over optical fibers 106. Information may be transmitted and received through optical network 101 by modulation of one or more wavelengths of light to encode the information on the wavelength. In optical networking, a wavelength of light may also be referred to as a channel. Each channel may be configured to carry a certain amount of information through optical network 101.

To increase the information capacity and transport capabilities of optical network 101, multiple signals transmitted at multiple channels may be combined into a single wideband optical signal. The process of communicating information at multiple channels is referred to in optics as wavelength division multiplexing (WDM). Coarse wavelength division multiplexing (CWDM) refers to the multiplexing of wavelengths that are widely spaced having low number of channels, usually greater than 20 nm and less than sixteen wavelengths, and dense wavelength division multiplexing (DWDM) refers to the multiplexing of wavelengths that are closely spaced having large number of channels, usually less than 0.8 nm spacing and greater than forty wavelengths, into a fiber. WDM or other multi-wavelength multiplexing transmission techniques are employed in optical networks to increase the aggregate bandwidth per optical fiber. Without WDM, the bandwidth in optical networks may be limited to the bit-rate of solely one wavelength. With more bandwidth, optical networks are capable of transmitting greater amounts of information. Optical network 101 may be configured to transmit disparate channels using WDM or some other suitable multichannel multiplexing technique, and to amplify the multi-channel signal.

Optical network 101 may include one or more optical transmitters (Tx) 102 configured to transmit optical signals through optical network 101 in specific wavelengths or channels. Transmitters 102 may comprise a system, apparatus or device configured to convert an electrical signal into an optical signal and transmit the optical signal. For example, transmitters 102 may each comprise a laser and a modulator to receive electrical signals and modulate the information contained in the electrical signals onto a beam of light produced by the laser at a particular wavelength, and transmit the beam for carrying the signal throughout optical network 101.

Multiplexer 104 may be coupled to transmitters 102 and may be a system, apparatus or device configured to combine the signals transmitted by transmitters 102, e.g., at respective individual wavelengths, into a WDM signal.

Optical amplifiers 108 may amplify the multi-channeled signals within optical network 101. Optical amplifiers 108 may be positioned before and/or after certain lengths of fiber 106. Optical amplifiers 108 may comprise a system, apparatus, or device configured to amplify optical signals. For example, optical amplifiers 108 may comprise an optical repeater that amplifies the optical signal. This amplification may be performed with opto-electrical or electro-optical conversion. In some embodiments, optical amplifiers 108 may comprise an optical fiber doped with a rare-earth element to form a doped fiber amplification element. When a signal passes through the fiber, external energy may be applied in the form of a pump signal to excite the atoms of the doped portion of the optical fiber, which increases the intensity of the optical signal. As an example, optical amplifiers 108 may comprise an erbium-doped fiber amplifier (EDFA).

OADMs 110 may be coupled to optical network 101 via fibers 106. OADMs 110 comprise an add/drop module, which may include a system, apparatus or device configured to add and/or drop optical signals (i.e., at individual wavelengths) from fibers 106. After passing through an OADM 110, an optical signal may travel along fibers 106 directly to a destination, or the signal may be passed through one or more additional OADMs 110 and/or optical amplifiers 108 before reaching a destination.

As shown in FIG. 1, optical network 101 may also include one or more demultiplexers 105 at one or more destinations of network 101. Demultiplexer 105 may comprise a system apparatus or device that acts as a demultiplexer by splitting a single composite WDM signal into individual channels at respective wavelengths. For example, optical network 101 may transmit and carry a forty (40) channel DWDM signal. Demultiplexer 105 may divide the single, forty channel DWDM signal into forty separate signals according to the forty different channels.

In certain embodiments of optical network 101, OADM 110 may represent a reconfigurable OADM (ROADM) that is capable of adding or dropping individual or multiple wavelengths of a WDM signal. The individual or multiple wavelengths may be added or dropped in the optical domain, for example, using a wavelength selective switch (WSS) (not shown) that may be included in a ROADM.

In FIG. 1, optical network 101 may also include receivers 112 coupled to demultiplexer 105. Each receiver 112 may be configured to receive optical signals transmitted at a particular wavelength or channel, and may process the optical signals to obtain (e.g., demodulate) the information (i.e., data) that the optical signals contain. Accordingly, network 101 may include at least one receiver 112 for every channel of the network.

Optical networks, such as optical network 101 in FIG. 1, may employ modulation techniques to convey information in the optical signals over the optical fibers. Such modulation schemes may include phase-shift keying (PSK), frequency-shift keying (FSK), amplitude-shift keying (ASK), and quadrature amplitude modulation (QAM), among other examples of modulation techniques. In PSK, the information carried by the optical signal may be conveyed by modulating the phase of a reference signal, also known as a carrier wave, or simply, a carrier. The information may be conveyed by modulating the phase of the signal itself using two-level or binary phase-shift keying (BPSK), four-level or quadrature phase-shift keying (QPSK), multi-level phase-shift keying (M-PSK) and differential phase-shift keying (DPSK). In QAM, the information carried by the optical signal may be conveyed by modulating both the amplitude and phase of the carrier wave. PSK may be considered a subset of QAM, wherein the amplitude of the carrier waves is maintained as a constant. Additionally, polarization division multiplexing (PDM) technology may enable achieving a greater bit rate for information transmission. PDM transmission comprises modulating information onto various polarization components of an optical signal associated with a channel. The polarization of an optical signal may refer to the direction of the oscillations of the optical signal. The term "polarization" may generally refer to the path traced out by the tip of the electric field vector at a point in space, which is perpendicular to the propagation direction of the optical signal.

In an optical network, such as optical network 101 in FIG. 1, it is typical to refer to a management plane, a control plane, and a transport plane (sometimes called the physical layer). A central management host (not shown) may reside in the management plane and may configure and supervise the components of the control plane. The management plane includes ultimate control over all transport plane and control plane entities (e.g., network elements). As an example, the management plane may consist of a central processing center (e.g., the central management host), including one or more processing resources, data storage components, etc. The management plane may be in electrical communication with the elements of the control plane and may also be in electrical communication with one or more network elements of the transport plane. The management plane may perform management functions for an overall system and provide coordination between network elements, the control plane, and the transport plane. As examples, the management plane may include an element management system (EMS) which handles one or more network elements from the perspective of the elements, a network management system (NMS) which handles many devices from the perspective of the network, and/or an operational support system (OSS) which handles network-wide operations.

Modifications, additions or omissions may be made to optical network 101 without departing from the scope of the disclosure. For example, optical network 101 may include more or fewer elements than those depicted in FIG. 1. Additionally network 101 may include additional elements not expressly shown, such as a dispersion compensation module (DCM). Also, as mentioned above, although depicted as a point-to-point network, optical network 101 may comprise any suitable network topology for transmitting optical signals such as a ring, a mesh, and/or a hierarchical network topology.

As discussed above, the amount of information that may be transmitted over an optical network may vary with the number of optical channels coded with information and multiplexed into one signal. Accordingly, an optical fiber employing a WDM signal may carry more information than an optical fiber that carries information over a single channel. Besides the number of channels and number of polarization components carried, another factor that affects how much information can be transmitted over an optical network may be the bit rate of transmission. The higher the bit rate, the greater the transmitted information capacity. Achieving higher bit rates may be limited by the availability of wide bandwidth electrical driver technology, digital signal processor technology and increase in the required OSNR for transmission over optical network 101.

In operation of optical network 101, reconfiguration of the optical signals to add and/or drop individual channels may be performed at OADMs 110. Under such add/drop cases, the surviving channels may systematically be subjected to power transients that result in under gain or over gain. The under or over gain of the surviving channels may accumulate rapidly along cascaded optical amplifiers 108 as this transient gain offset may lead to undesirable variation in output signal power and received OSNR. In particular, as higher bit rates, for example, up to 100 gigabits per second are used for transmission over optical network 101, the received OSNR to achieve such higher bit rates may be reduced due to transient gain effects. In addition to network throughput, variation in OSNR due to transient gain effects may constrain a transmission distance (i.e., reach) of at least certain portions of optical network 101.

In optical network 101, two kinds of transient gain effects may be observed: transient gain excursion (TGE) and post-transient gain offset (PGO). TGE may be compensated or minimized dynamically using fast gain control, for example, in optical amplifiers 108. On the other hand, PGO may be difficult to minimize and may be manageable to some extent using NMS system level software, which may be a relatively slow and an inaccurate method of correcting PGO.

As will be described in further detail herein, the methods and systems disclosed herein for post-transient gain control may involve a dynamic PGO cancellation loop control system within an optical amplifier. The methods and system disclosed herein for PGO control may represent a relatively fast and accurate method that may be using at a number of optical amplifiers 108 in optical network 101.

Figure 2:
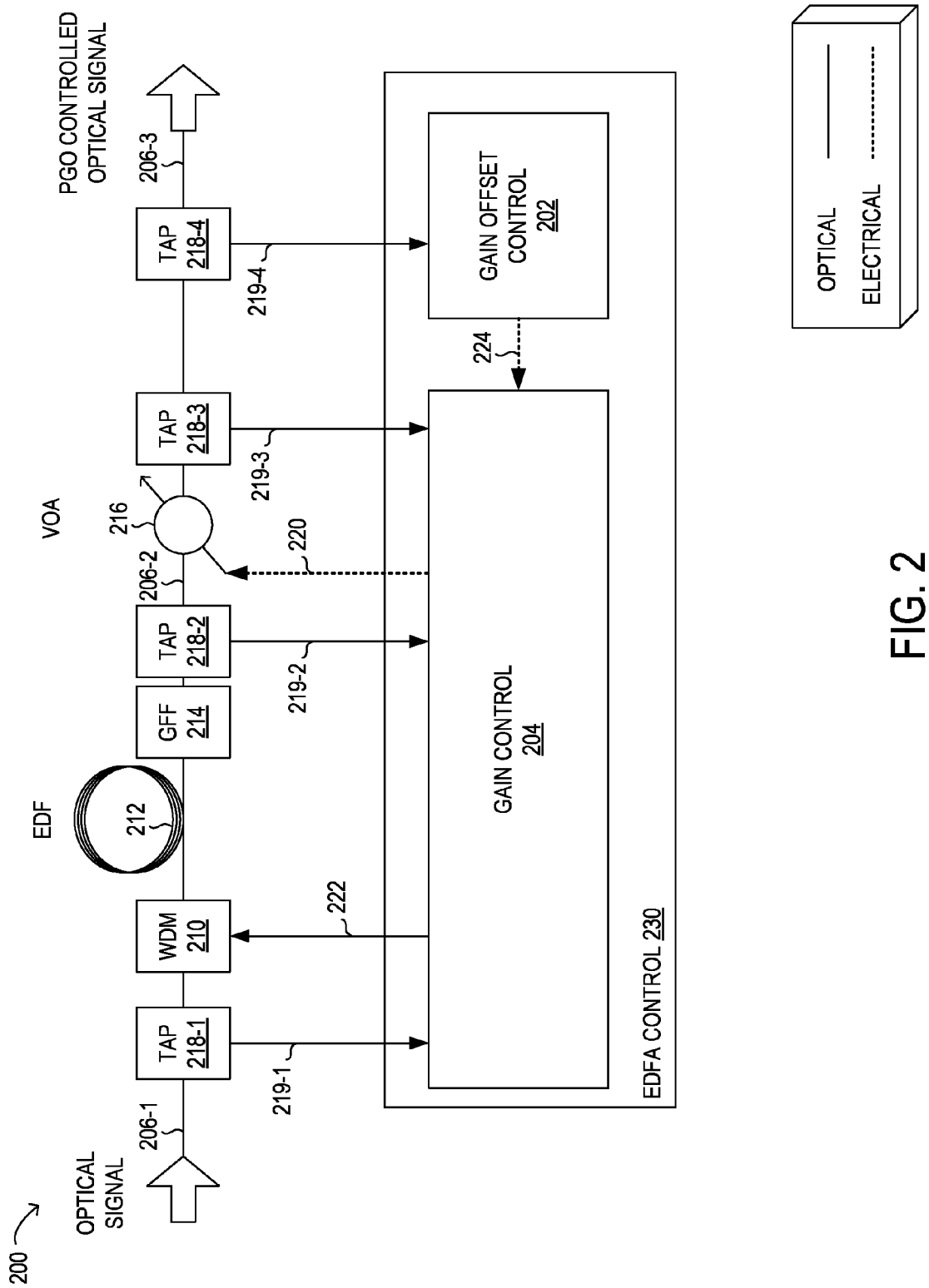
FIG. 2 is a block diagram of selected elements of an embodiment of an optical amplifier employing post-transient gain offset control.

Turning now to FIG. 2, an example embodiment of optical amplifier 200 employing PGO control is illustrated in block diagram format. As shown, optical amplifier 200 may represent an embodiment of optical amplifier 108 (see FIG. 1) and may include EDFA control 230, comprising gain control 204 and gain offset control 202. Accordingly, optical amplifier 200 may receive optical signal 206-1 as input and may output PGO-controlled optical signal 206-3, as will be described in further detail. In particular, optical amplifier 200 may be used in optical network 101 after an instance of OADMs 110 is used to add and/or drop channels, which may represent a source of PGO in optical signal 206. In FIG. 2, optical amplifier 200 is shown including various optical taps 218, which may represent any of a variety of optical splitters for performing measurements on optical signal 206 at various points within optical amplifier 200, as will be described in further detail. As shown in FIG. 2, optical amplifier 200 may represent a device comprising various components and signals between the components, which may include signals in the optical domain (shown connected with a solid line) as well as signals in the electrical domain (shown connected with a dashed line). It is noted that arrows depicted in signal lines in FIG. 2 are intended to show information flow and may not necessarily represent a direction of transmission of a corresponding signal media (e.g., transmission of an optical signal or an electrical current).

In FIG. 2, optical amplifier 200 may include optical tap 218-1 for measuring optical signal 206-1 arriving as an input to optical amplifier 200. Optical signal 219-1 output from optical tap 218-1 may be provided to gain control 204, which may output pump signal 222 having a power intensity regulated by gain control 204. Pump signal 222 may be combined with optical signal 206-1 passing through optical tap 218-1 at wavelength division multiplexer (WDM) 210 and may thus be fed to a doped fiber amplification element (shown in the exemplary embodiment of FIG. 2 as erbium-doped fiber (EDF) 212), which may then amplify optical signal 206-1. After amplification by EDF 212 and filtering by gain flattening filter (GFF) 214, optical signal 206-2, which passes through optical tap 218-2, may represent the amplified signal output by EDF 212. It is noted that in different embodiments, other types of doped fiber amplification elements may be used in place of EDF 212.

In FIG. 2, upon receiving optical signal 219-2 output from optical tap 218-2, gain control 204 may regulate attenuation control signal 220, which may then be fed as an electrical input to variable optical attenuator (VOA) 216, which, in turn, may attenuate optical signal 206-2 to result in optical signal 206-3, which passes through optical taps 218-3 and 218-4. Optical signal 219-3 output from optical tap 218-3 may be provided to gain control 204, which may use optical signal 219-3, among other inputs, to generate pump signal 222 and/or attenuation control signal 220, as will be described in further detail in FIGS. 3A and 3B below. Additionally, gain control 204 may receive offset cancelling signal 224, which may also be used by gain control 204 to regulate pump signal 222 and/or attenuation control signal 220 for PGO control. In different embodiments, gain control 204 may use offset cancelling signal 224 for open loop feed-forward PGO control (see FIG. 3A) and/or closed loop feedback PGO control (see FIG. 3B). Furthermore, gain offset control 202 may receive optical signal 219-4 from optical tap 218-4 and may generate offset cancelling signal 224 for use by gain control 204.

In operation of optical amplifier 200 shown in FIG. 2, EDFA control 230 may employ gain offset control 202 to regulate a desired gain of optical signal 206 by generating pump signal 222 and/or attenuation control signal 220. In this manner, PGO control of optical signal 206 may be achieved with a desired combination of gain and/or attenuation to reduce or substantially eliminate power variants in optical signal 206.

Figure 3A:
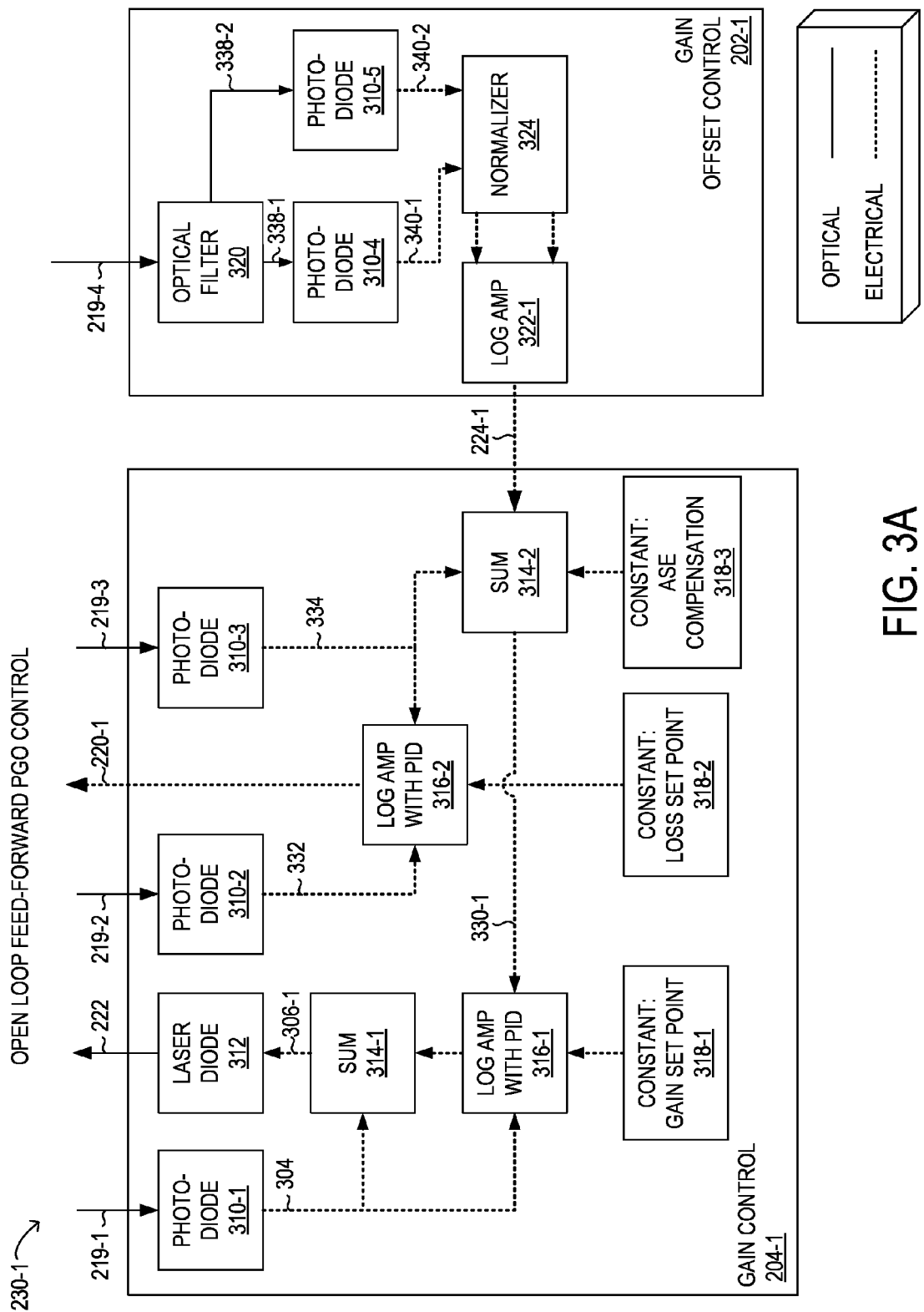
FIG. 3A is a block diagram of selected elements of an embodiment of an optical amplifier employing post-transient gain offset control.

Turning now to FIG. 3A, an example embodiment of EDFA control 230-1 employing PGO control is illustrated in block diagram format. As shown, EDFA control 230-1 may represent an embodiment of EDFA control 230 (see FIG. 2)

and may include gain control 204-1, and gain offset control 202-1. In particular, EDFA control 230-1 may represent an embodiment of PGO control using an open loop feed-forward technique in which offset cancelling signal 224-1 is used to regulate pump signal 222. As shown in EDFA control 230-1, offset cancelling signal 224-1 may be a function of gain and/or spectral allocation of channels in optical signal 206 (see FIG. 2).

In EDFA control 230-1 as shown in FIG. 3A, optical signal 219-1 may be converted to input power signal 304 by photodiode 310-1 to provide an indication of input power received by optical amplifier 200. Similarly, optical signal 219-2 may be converted to power signal 332 to provide an indication of power level after amplification by EDF 212 but before attenuation by VOA 216, while optical signal 219-3 may be converted to power signal 334 to provide an indication of power level after attenuation by VOA 216. Log amp with PID 316-1 may represent a differential logarithmic amplifier and a proportional-integral-differential (PID) controller for amplifying and regulating input signals to generate a desired output signal. Specifically, log amp with PID 316-1 may receive power signal 304, constant gain set point 318-1, as well as offset 330-1, which may be indicative of constant amplified spontaneous emission (ASE) compensation 318-3 and power signal 334 (i.e., from output optical signal 206-3) corresponding to the output from optical amplifier 200. In the embodiment of EDFA control 230-1 shown in FIG. 3A, offset 330-1 may also be indicative of offset cancelling signal 224-1. As shown in FIG. 3A, offset 330-1 may be generated by sum 314-2 shown receiving constant ASE compensation 318-3, offset cancelling signal 224-1, and power signal 334. Log amp with PID 316-1 may generate an output, which is received as an input by sum 314-1, along with power signal 304, to generate pump control signal 306-1, which, in turn, is used by laser diode 312 to generate pump signal 222. To generate attenuation control signal 220-1, gain control 204-1 may generate an output from log amp with PID 316-2, which may receive power signals 332 and 334, along with constant loss set point 318-2. As shown in FIG. 3A, constants 318 may output electrical signals, either digital and/or analog signals, that represent certain constant values that may be programmed for use with optical amplifier 200. For example, constants 318 may be stored in a look-up table that may be accessible to a plurality of instances of optical amplifier 200 within optical network 101. It is noted that values associated with constants 318 may be externally regulated by an NMS and/or another entity, for example, to exert central control of optical network 101, which may cause the values associated with constants 318 to change.

Also shown in FIG. 3A is gain offset control 202-1 which may generate offset cancelling signal 224-1 for use by gain control 204-1, as described above. Gain offset control 202-1 may receive optical signal 219-4 and may include optical filter 320 to generate first filtered optical signal 338-1 and second filtered optical signal 338-2. In some embodiments, optical signal 219-4 may be used to capture output optical energy of optical amplifier 200. In other embodiments, optical signal 219-4 may be used to capture reflected light, such as Rayleigh backscattered light, coming back from subsequent elements in optical network 101, which may be advantageous in coordinating downstream PGO control.

In FIG. 3A, optical filter 320 may be any of a variety of different types of optical filters for various implementations of gain offset control 202-1. In one embodiment, optical filter 320 may be a wavelength dependent loss (WDL) filter, while first filtered optical signal 338-1 is down band tilt and second filtered optical signal 338-2 is up band tilt. As used herein with respect to embodiments of optical amplifier 200, "tilt" may refer to a linear power scaling that is dependent upon wavelength (e.g., channel) within optical signal 206. In another embodiment, optical filter 320 may be a wide band filter, while first filtered optical signal 338-1 is a blue wideband signal and second filtered optical signal 338-2 is a red wideband signal. In particular embodiments, optical filter 320 may be a narrow band filter, while first filtered optical signal 338-1 yields a blue narrowband noise signal and second filtered optical signal 338-2 yields a red narrowband noise signal. In still other embodiments, optical filter 320 may be a tunable filter, such that first filtered optical signal 338-1 and second filtered optical signal 338-2 output respective pass bands, depending on a respective spectral shape of the tuning applied to optical filter 320. Then, first filtered optical signal 338-1 may be converted to first filtered power signal 340-1 by photodiode 310-4 and second filtered optical signal 338-2 may be converted to second filtered power signal 340-2 by photodiode 310-5. First filtered power signal 340-1 and second filtered power signal 340-2 may be processed by normalizer 324 to generate normalized outputs for amplification by log amp 322-1 to then output offset cancelling signal 224-1. In certain embodiments, normalizer 324 may perform a sum-and-difference normalization, while log amp 322-1 may be a differential logarithmic amplifier.

Figure 3B:
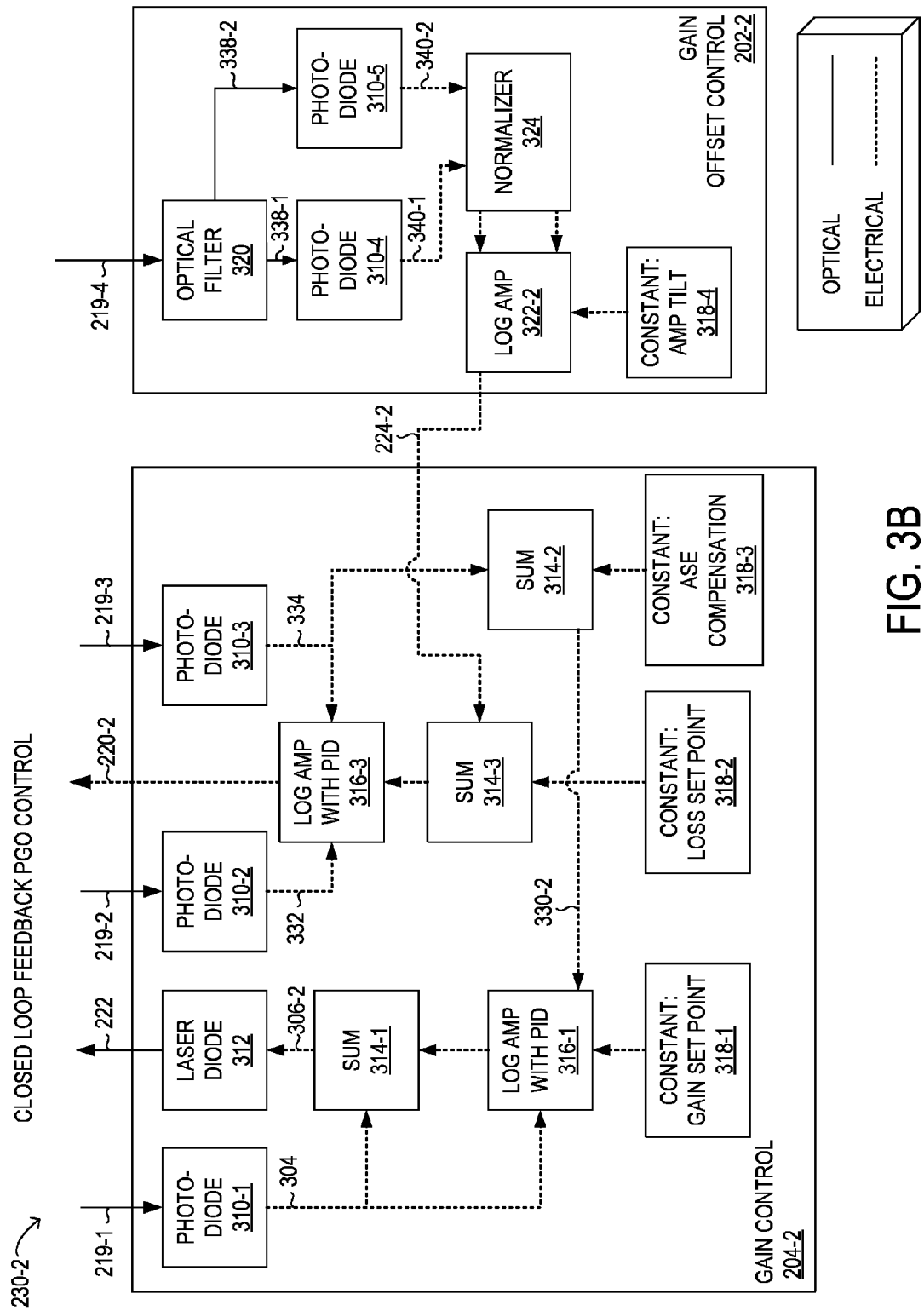
FIG. 3B is a block diagram of selected elements of an embodiment of an optical amplifier employing post-transient gain offset control.

Turning now to FIG. 3B, an example embodiment of EDFA control 230-2 employing PGO control is illustrated in block diagram format. As shown, EDFA control 230-2 may represent an embodiment of EDFA control 230 (see FIG. 2) and may include gain control 204-2, and gain offset control 202-2. In particular, EDFA control 230-2 may represent an embodiment of PGO control using a closed loop feedback technique in which offset cancelling signal 224-2 is used to regulate attenuation control signal 220-2. As shown in EDFA control 230-2, offset cancelling signal 224-1 may represent a desired value for amplifier tilt.

In EDFA control 230-2 as shown in FIG. 3B, optical signal 219-1 may be converted to input power signal 304 by photodiode 310-1 to provide an indication of input power received by optical amplifier 200. Similarly, optical signal 219-2 may be converted to power signal 332 to provide an indication of power level after amplification by EDF 212 but before attenuation by VOA 216, while optical signal 219-3 may be converted to power signal 334 to provide an indication of power level after attenuation by VOA 216. Log amp with PID 316-1 may represent a differential logarithmic amplifier followed by a PID controller for amplifying and regulating input signals to generate a desired output signal. Specifically, log amp with PID 316-1 may receive power signal 304, constant gain set point 318-1, as well as offset 330-2, which may be indicative of constant ASE compensation 318-3 and power signal 334 (i.e., from output optical signal 206-3) corresponding to the output from optical amplifier 200. In the embodiment of EDFA control 230-2 shown in FIG. 3B, offset 330-2 may be generated by sum 314-2 shown receiving constant ASE compensation 318-3 and power signal 334. Log amp with PID 316-1 may generate an output, which is received as an input by sum 314-1, along with power signal 304, to generate pump control signal 306-2, which, in turn, is used by laser diode 312 to generate pump signal 222. To generate attenuation control signal 220-2, gain control 204-2 may generate an output from log amp with PID 316-3, which may receive power signals 332 and 334, along with an output from sum 314-3, which may receive constant loss set point 318-2 and offset cancelling signal 224-2. As shown in FIG. 3B, constants 318 may output electrical signals, either digital and/or analog signals, that represent certain constant values that may be programmed for use with optical amplifier 200. For example, constants 318 may be stored in a look-up table that may be accessible to a plurality of instances of optical amplifier 200 within optical network 101. It is noted that values associated with constants 318 may be externally regulated by an NMS and/or another entity, for example, to exert central control of optical network 101, which may cause the values associated with constants 318 to change.

Also shown in FIG. 3B is gain offset control 202-2 which may generate offset cancelling signal 224-2 for use by gain control 204-2, as described above. Gain offset control 202-2 may receive optical signal 219-4 and may include optical filter 320 to generate first filtered optical signal 338-1 and second filtered optical signal 338-2. In some embodiments, optical signal 219-4 may be used to capture output optical energy of optical amplifier 200. In other embodiments, optical signal 219-4 may be used to capture reflected light, such as Rayleigh backscattered light, coming back from subsequent elements in optical network 101, which may be advantageous in coordinating downstream PGO control.

In FIG. 3B, optical filter 320 may be any of a variety of different types of optical filters for various uses of gain offset control 202-2, as described above with respect to gain offset control 202-1 (see FIG. 3A). Then, first filtered optical signal 338-1 may be converted to first filtered power signal 340-1 by photodiode 310-4 and second filtered optical signal 338-2 may be converted to second filtered power signal 340-2 by photodiode 310-5. First filtered power signal 340-1 and second filtered power signal 340-2 may be processed by normalizer 324 to generate normalized outputs for amplification by log amp 322-2 to then output offset cancelling signal 224-2. Log amp 322-2 may also receive as input constant amp tilt 318-4. In certain embodiments, normalizer 324 may perform a sum-and-difference normalization, while log amp 322-2 may be a differential logarithmic amplifier.

Figure 4:
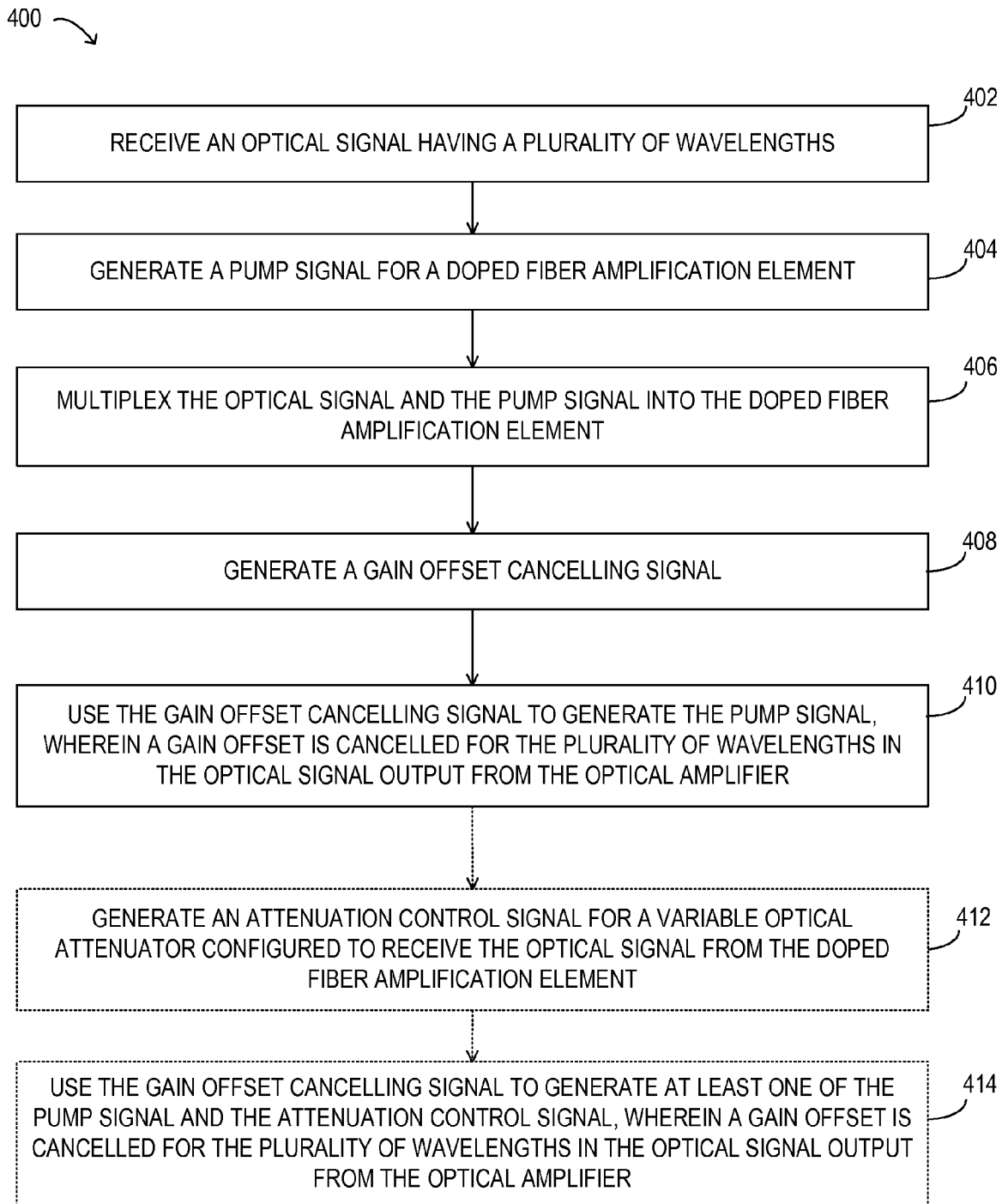
FIG. 4 is a flow diagram of selected elements of an embodiment of a method for post-transient gain offset control using an optical amplifier.

Referring now to FIG. 4, a block diagram of selected elements of an embodiment of method 400 for PGO control is depicted in flowchart form. Method 400 may be performed using network 101 (see FIG. 1) and optical amplifier 200 (see FIG. 2), for example, by using implementations described in FIGS. 3A and/or 3B. It is noted that certain operations described in method 400 may be optional or may be rearranged in different embodiments.

Method 400 may begin by receiving (operation 402) an optical signal having a plurality of wavelengths. A pump signal may be generated (operation 404) for a doped fiber amplification element. The optical signal and the pump signal may be multiplexed (operation 406) into the doped fiber amplification element. A gain offset cancelling signal may be generated (operation 408). The gain offset cancelling signal may be used (operation 410) to generate at least one of the pump signal and the attenuation control signal, wherein a gain offset is cancelled for the plurality of wavelengths in the optical signal output from the optical amplifier. In certain embodiments, additional operations 412 and/or 414 (shown with dashed lines in FIG. 4) may optionally be performed in method 400. An attenuation control signal may be generated (operation 412) for a variable optical attenuate configured to receive the optical signal from the doped fiber amplification element. The gain offset cancelling signal may be used to generate (operation 414) at least one of the pump signal and the attenuation control signal, wherein a gain offset is cancelled for the plurality of wavelengths in the optical signal output from the optical amplifier. In some embodiments, operation 414 may replace operation 410, for example, when operation 412 is performed.

Figure 5:
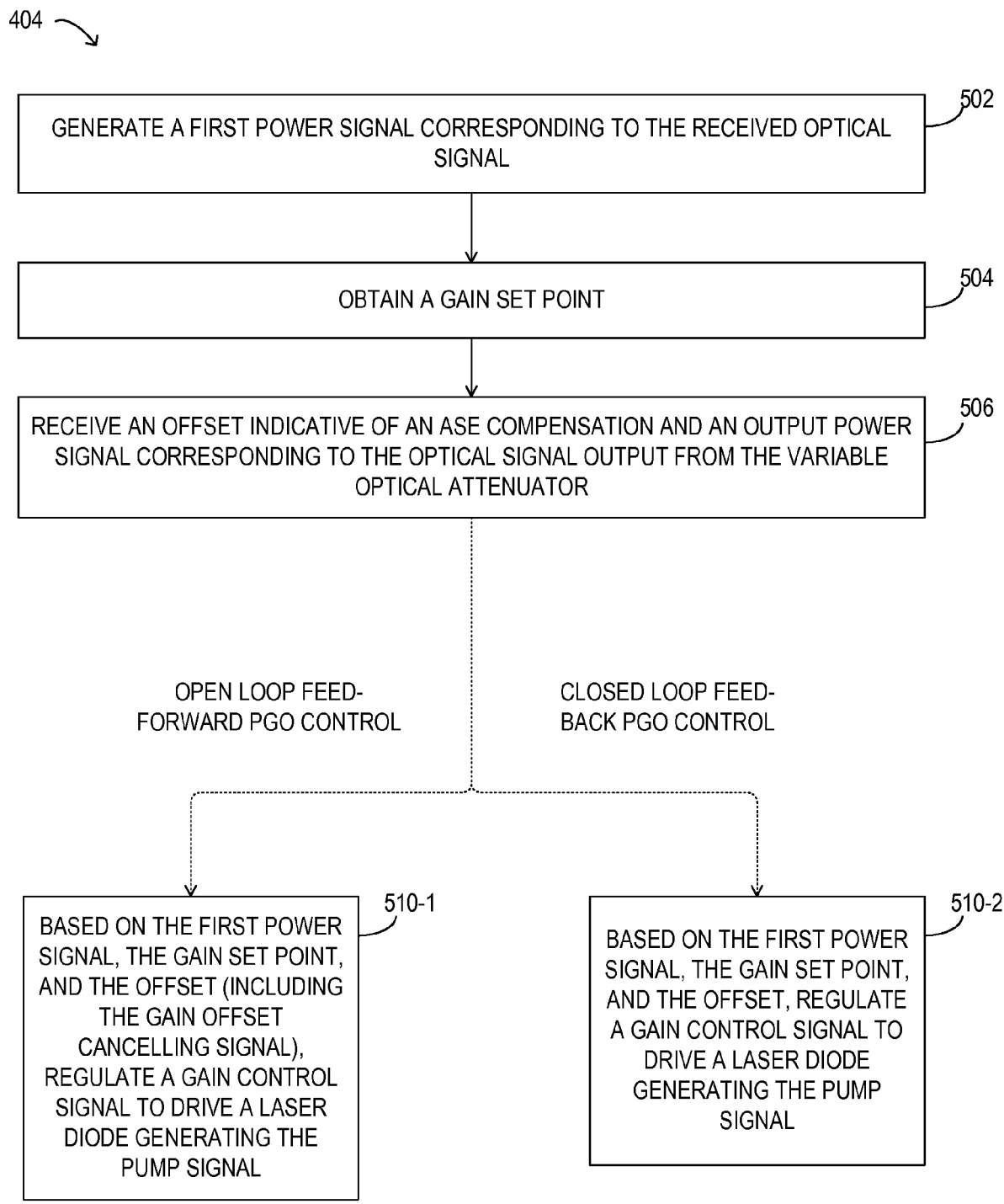
FIG. 5 is a flow diagram of selected elements of an embodiment of a method for post-transient gain offset control using an optical amplifier.

Referring now to FIG. 5, a block diagram of selected elements of an embodiment of method 404 for PGO control is depicted in flowchart form. Method 404 may represent embodiments of operation 404 in method 400 (see FIG. 4) and may be performed using network 101 (see FIG. 1) and optical amplifier 200 (see FIG. 2), for example, by using implementations described in FIGS. 3A and 3B. It is noted that certain operations described in method 404 may be optional or may be rearranged in different embodiments.

Method 404 may begin by generating (operation 502) a first power signal corresponding to the received optical signal. A gain set point may be obtained (operation 504). An offset may be received (operation 506) that is indicative of an ASE compensation and an output power signal corresponding to the optical signal output from the variable optical attenuator. Then, method 404 may proceed according to at least one of two variants. For example, when open loop feed-forward PGO control is employed (see also FIG. 3A), based on the first power signal, the gain set point, and the offset (including the gain offset cancelling signal), a gain control signal may be regulated (operation 510-1) to drive a laser diode generating the pump signal. For example, when closed loop feedback PGO control is employed (see also FIG. 3B), based on the first power signal, the gain set point, and the offset, a gain control signal may be regulated (operation 510-2) to drive a laser diode generating the pump signal.

Figure 6:
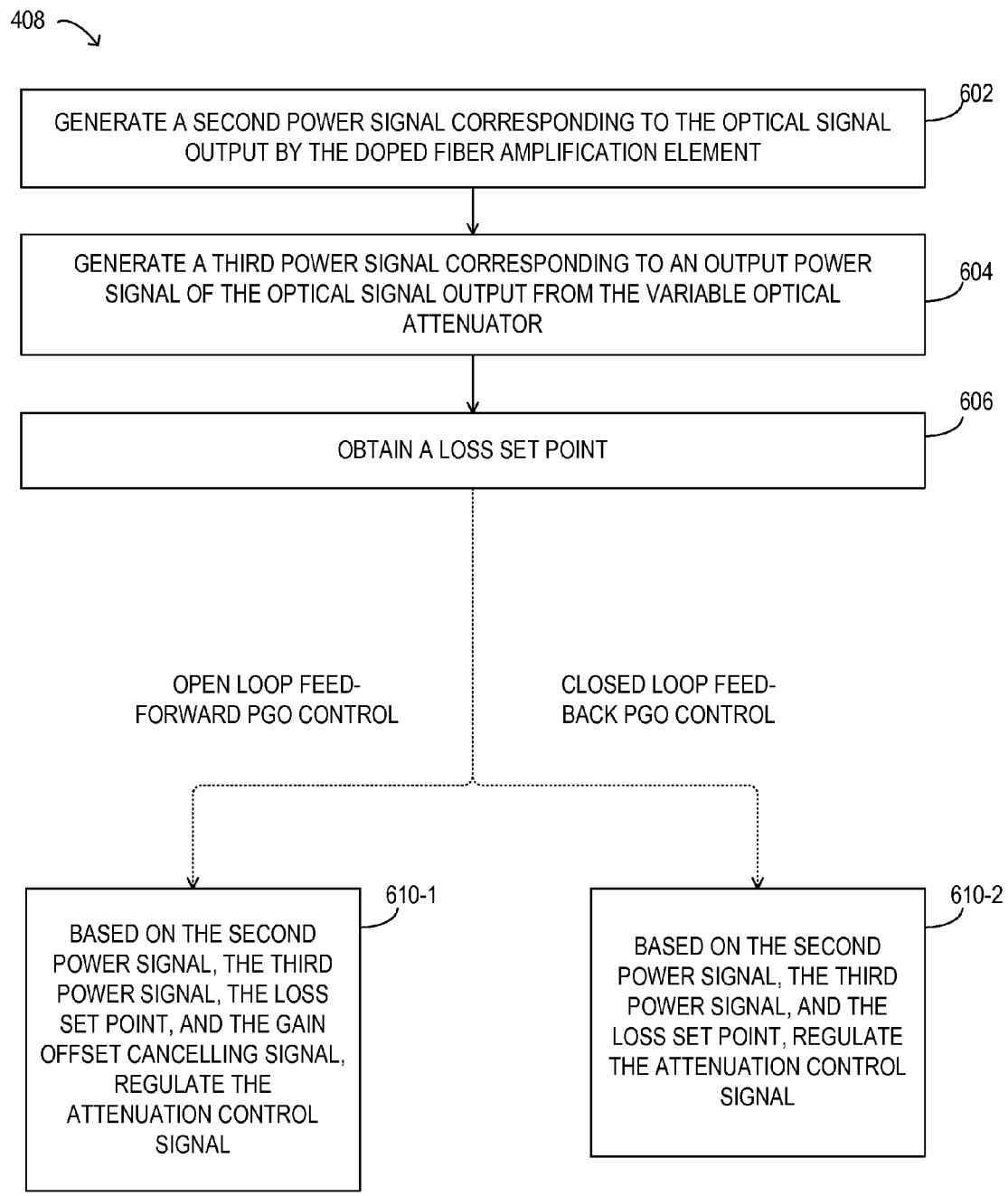
FIG. 6 is a flow diagram of selected elements of an embodiment of a method for post-transient gain offset control using an optical amplifier.

Referring now to FIG. 6, a block diagram of selected elements of an embodiment of method 408 for PGO control is depicted in flowchart form. Method 408 may represent embodiments of operation 408 in method 400 (see FIG. 4) and may be performed using network 101 (see FIG. 1) and optical amplifier 200 (see FIG. 2), for example, by using implementations described in FIGS. 3A and 3B. It is noted that certain operations described in method 408 may be optional or may be rearranged in different embodiments.

Method 408 may begin by generating (operation 602) a second power signal corresponding to the optical signal output by the doped fiber amplification element. A third power signal corresponding to an output power signal of the optical signal output from the variable optical attenuator may be generated (operation 604). A loss set point may be obtained (operation 606). Then, method 408 may proceed according to at least one of two variants. For example, when open loop feed-forward PGO control is employed (see also FIG. 3A), based on the second power signal, the third power signal, the loss set point, and the gain offset cancelling signal, an attenuation control signal may be regulated (operation 610-1). For example, when closed loop feedback PGO control is employed (see also FIG. 3B), based on the second power signal, the third power signal, and the loss set point, an attenuation control signal may be regulated (operation 610-2).

Figure 7:
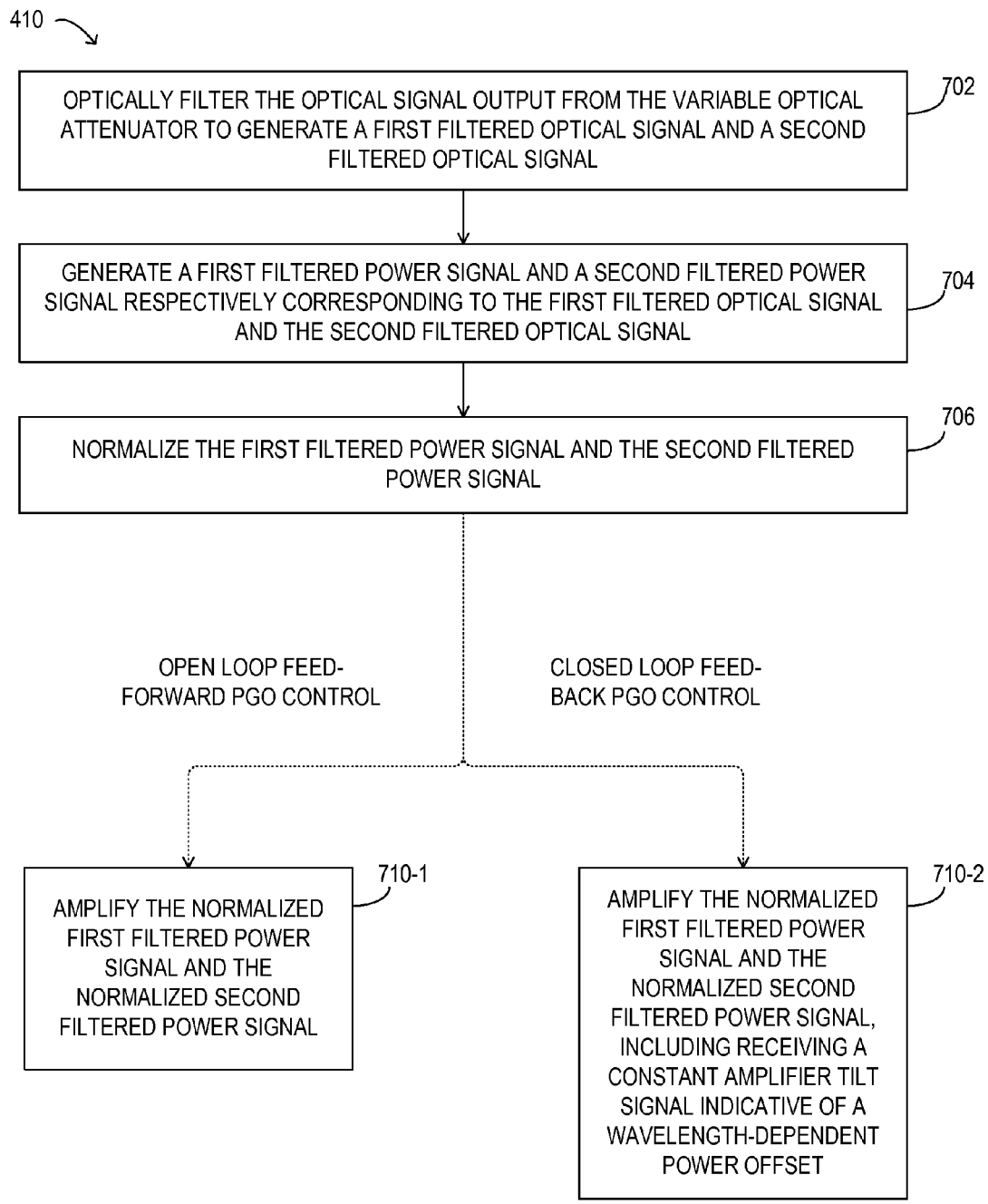
FIG. 7 is a flow diagram of selected elements of an embodiment of a method for post-transient gain offset control using an optical amplifier.

Referring now to FIG. 7, a block diagram of selected elements of an embodiment of method 410 for PGO control is depicted in flowchart form. Method 410 may represent embodiments of operation 410 in method 400 (see FIG. 4) and may be performed using network 101 (see FIG. 1) and optical amplifier 200 (see FIG. 2), for example, by using implementations described in FIGS. 3A and 3B. It is noted that certain operations described in method 410 may be optional or may be rearranged in different embodiments.

Method 410 may begin by optically filtering (operation 702) the output signal from the variable optical attenuator to generate a first filtered optical signal and a second filtered optical signal. A first filtered power signal and a second filtered power signal respectively corresponding to the first filtered optical signal and the second filtered optical signal may be generated (operation 704). The first filtered power signal and the second filtered power signal may be normalized (operation 706). Then, method 410 may proceed according to at least one of two variants. For example, when open loop feed-forward PGO control is employed (see also FIG. 3A), the normalized first filtered power signal and the normalized second filtered power signal may be amplified (operation 710-1). For example, when closed loop feedback PGO control is employed (see also FIG. 3B), the normalized first filtered power signal and the normalized second filtered power signal may be amplified (operation 710-2), including receiving a constant amplifier tilt signal indicative of a wavelength-dependent power offset.

As disclosed herein, methods and systems for post transient gain offset control of optical amplifiers may include using a gain offset control module in an optical amplifier to generate a gain offset cancelling signal. The gain offset cancelling signal may be output to a gain control module in the optical amplifier to generate at least one of a pump signal and an attenuation control signal. In this manner, a gain offset may be cancelled for a plurality of wavelengths in an optical signal transmitted by an optical network.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for post-transient gain control of an optical amplifier, comprising:
   receiving an optical signal having a plurality of wavelengths;
   generating a pump signal for a doped fiber amplification element;
   multiplexing the optical signal and the pump signal into the doped fiber amplification element;
   generating a gain offset cancelling signal;
   generating a gain control signal using the gain offset cancelling signal, a first power signal corresponding to the received optical signal, a gain set point, an offset indicative of an amplified spontaneous emission (ASE) compensation, and a second power signal corresponding to the optical signal output from a variable optical attenuator configured to receive the optical signal from the doped fiber amplification element; and
   using the gain control signal to regulate the pump signal to reduce gain offset for the plurality of wavelengths in the optical signal output from the optical amplifier.

2. The method of claim 1, further comprising:
   generating an attenuation control signal for the variable optical attenuator using the second power signal, a loss set point, and a third power signal corresponding to the optical signal output by the doped fiber amplification element.

3. The method of claim 1, wherein
   regulating the pump signal includes driving a laser diode.

4. The method of claim 1, wherein generating the gain offset cancelling signal comprises:
   optically filtering the optical signal output from the variable optical attenuator to generate a first filtered optical signal and a second filtered optical signal;
   generating a first filtered power signal and a second filtered power signal respectively corresponding to the first filtered optical signal and the second filtered optical signal;
   normalizing the first filtered power signal and the second filtered power signal; and
   amplifying the normalized first filtered power signal and the normalized second filtered power signal.

5. An optical amplifier for receiving an optical signal having a plurality of wavelengths and performing post-transient gain control, comprising:
   a gain offset control module to generate a gain offset cancelling signal;
   a gain control module, including a pump signal control loop for outputting a pump signal to a doped fiber amplification element, wherein the optical signal and the pump signal are multiplexed into the doped fiber amplification element, the pump signal control loop comprising
      a first electronic amplifier for generating a gain control signal using the gain offset cancelling signal, a first power signal corresponding to the received optical signal, a gain set point, an offset indicative of an amplified spontaneous emission (ASE) compensation, and a second power signal corresponding to the optical signal output from a variable optical attenuator configured to receive the optical signal from the doped fiber amplification element, and
      a laser diode driven by the gain control signal to regulate the pump signal to reduce gain offset for the plurality of wavelengths in the optical signal output from the optical amplifier.

6. The optical amplifier of claim 5, wherein the gain control module further includes
   an attenuation control loop for outputting an attenuation control signal to the variable optical attenuator, the attenuation control loop comprising
      a second electronic amplifier that generates the attenuation control signal using the second power signal, a loss set point, and a third power signal corresponding to the optical signal output by the doped fiber amplification element.

7. The optical amplifier of claim 5, wherein the gain offset control module comprises:
   an optical filter for optically filtering the optical signal output from the variable optical attenuator to generate a first filtered optical signal and a second filtered optical signal;
   a fourth photodiode generating a first filtered power signal corresponding to the first filtered optical signal;
   a fifth photodiode generating a second filtered power signal corresponding to the second filtered optical signal;
   a normalizer to normalize the first filtered power signal and the second filtered power signal; and
   a third electronic amplifier to amplify the normalized first filtered power signal and the normalized second filtered power signal.

8. An optical communication system comprising:
   a transmitter that transmits an optical signal having a plurality of wavelengths over an optical signal transmission path;
   a receiver that receives the optical signal from the optical signal transmission path;
   an optical add-drop multiplexer in the optical signal transmission path; and
   an optical amplifier that receives the optical signal from the optical add-drop multiplexer, the optical amplifier further comprising:
   a gain offset control module to generate a gain offset cancelling signal;

a gain control module, including a pump signal control loop for outputting a pump signal to a doped fiber amplification element, wherein the optical signal and the pump signal are multiplexed into the doped fiber amplification element, the pump signal control loop comprising
   a first electronic amplifier for generating a gain control signal using the gain offset cancelling signal, a first power signal corresponding to the received optical signal, a gain set point, an offset indicative of an amplified spontaneous emission (ASE) compensation, and a second power signal corresponding to the optical signal output from a variable optical attenuator configured to receive the optical signal from the doped fiber amplification element, and
   a laser diode driven by the gain control signal to regulate the pump signal to reduce gain offset for the plurality of wavelengths in the optical signal output from the optical amplifier.

9. The optical communication system of claim 8, wherein the gain control module further includes
   an attenuation control loop for outputting an attenuation control signal to the variable optical attenuator, the attenuation control loop comprising
      a second electronic amplifier that generates the attenuation control signal using the second power signal, a loss set point, and a third power signal corresponding to the optical signal output by the doped fiber amplification element.

10. The optical communication system of claim 8, wherein the gain offset control module comprises:
   an optical filter for optically filtering the optical signal output from the variable optical attenuator to generate a first filtered optical signal and a second filtered optical signal;
   a fourth photodiode generating a first filtered power signal corresponding to the first filtered optical signal;
   a fifth photodiode generating a second filtered power signal corresponding to the second filtered optical signal;
   a normalizer to normalize the first filtered power signal and the second filtered power signal; and
   a third electronic amplifier to amplify the normalized first filtered power signal and the normalized second filtered power signal.

11. A method for post-transient gain control of an optical amplifier, comprising:
   receiving an optical signal having a plurality of wavelengths;
   generating a pump signal for a doped fiber amplification element;
   multiplexing the optical signal and the pump signal into the doped fiber amplification element;
   generating a gain offset cancelling signal;
   generating a gain control signal using a first power signal corresponding to the received optical signal, a gain set point, an offset indicative of an amplified spontaneous emission (ASE) compensation, and a second power signal corresponding to the optical signal output from a variable optical attenuator configured to receive the optical signal from the doped fiber amplification element;
   generating an attenuation control signal for the variable optical attenuator using the gain offset cancelling signal, the second power signal, a third power signal corresponding to the optical signal output by the doped fiber amplification, and a loss set point; and
   using a combination of the gain control signal, to regulate the pump signal, and the attenuation control signal to reduce gain offset for the plurality of wavelengths in the optical signal output from the optical amplifier.

* * * * *